United States Patent [19]

Burek et al.

[11] Patent Number: 5,677,975

[45] Date of Patent: Oct. 14, 1997

[54] CABLE GRIP BLOCK ASSEMBLY

[75] Inventors: Denis Edward Burek, Cumming; Marc Duane Jones, Lithonia, both of Ga.

[73] Assignee: Lucent Technologies Inc., Murray Hill, N.J.

[21] Appl. No.: 579,527

[22] Filed: Dec. 27, 1995

[51] Int. Cl.⁶ .................................................. G02B 6/00
[52] U.S. Cl. .................................................. 385/136
[58] Field of Search ................................. 385/134–136, 385/147; 174/153 G; 248/56, 74.4; 24/134 P

[56] References Cited

U.S. PATENT DOCUMENTS

| | | | |
|---|---|---|---|
| 4,000,875 | 1/1977 | Jemison et al. | 174/153 G |
| 4,927,227 | 5/1990 | Bensel, III et al. | 350/96.2 |
| 4,958,903 | 9/1990 | Cobb et al. | 385/135 |
| 5,420,957 | 5/1995 | Burek et al. | 385/135 |
| 5,440,666 | 8/1995 | Burek et al. | 385/135 |
| 5,472,160 | 12/1995 | Burek et al. | 385/135 |
| 5,519,804 | 5/1996 | Burek et al. | 385/135 |

*Primary Examiner*—Akm E. Ullah

[57] ABSTRACT

A grip block assembly for gripping cables or other elongated members has a substantially hollow frame member having openings in the walls thereof to allow an elongated member to pass therethrough. First and second lever arms pivotal on the same axis are adapted to be pivoted in a scissoring action to grip a portion of the elongated member and to force it into contact with a gripping surface on an actuator block which is reciprocally movable within the hollow frame member. The actuator block has depending members which contact the lever arms for causing them to pivot with respect to each other, and a captive bolt held in place by a cap on the frame functions to move the actuator block.

24 Claims, 7 Drawing Sheets

CABLE GRIP BLOCK ASSEMBLY

FIELD OF INVENTION

This invention relates to an optical fiber cable apparatus, and more particularly to a cable grip block assembly for immobilizing such a cable in operations such as splicing and connecting.

BACKGROUND OF THE INVENTION

Present day communications technology is directed more and more to the use of optical fibers for signal transmission and, consequently, the use of optical fiber cables which contain, generally, large numbers of individual fibers in any of a variety of configurations such as, for example, ribbon stacks, buffered fibers, or loose tube arrangements. Such cables generally include one or more strength members and, often, a surrounding corrugated metallic shield encased in an insulating jacket.

The physical nature of optical fibers forecloses operating on them for splicing or connecting in the manner of electrical wires. Because of their small size and their relative fragility, optical fibers must be handled with a great deal of care. Transmission capabilities may be, and generally are, impaired if an optical fiber is bent beyond an allowable bending radius, i.e., are bent to a smaller radius than that where the light is no longer totally contained within the fiber core. In addition, such fibers are brittle and their expected life is reduced if they are bent to a radius less than the allowable radius. Whereas glass and silica, the materials used to make optical fibers are, in some respects, stronger than steel, they do not ordinarily exhibit this potential strength because of microscopic surface fractures which are vulnerable to stress and spread with a concomitant risk of fiber fracture or complete breakage. As noted in the foregoing, optical fibers cannot be handled or treated in the manner of electrical wires. In general, the individual fibers of an optical fiber cable cannot be bunched, tied, wrapped, and moved in anything approaching the manner of metallic conductors. Most especially, they cannot be crimped or bent at small radii or angles without breaking. Furthermore, glass fibers have memory and tend to return to a straight line configuration, which adds to the difficulty in handling.

These problems arising from the characteristics of fibers are particularly acute in multifiber optical fiber cables wherein the fibers are to be spliced or otherwise joined in a manner which allows for future repairs or maintenance. Arrangements for splicing the optical fibers in a multifiber cable usually involve a splice closure or case for housing and protecting the splices and for storing necessary fiber slack. When splicing fibers by fusion or mechanical means, it is necessary to provide enough slack fiber so that the fibers can be lifted out of an open splice case for preparation and joining of the fiber ends. This requires, usually, at least one-half meter of slack or excess fiber which must then be stored within the splice case after the splicing is completed and the case closed and sealed. For a multifiber cable the case or closure must be capable of storing the slack without creating sharp bends or kinks, of protecting the splices, and of maintaining the fibers substantially immobilized in an orderly manner, and yet readily accessible for operation thereon and rearrangement, where necessary. These desiderata are especially needed where splicing or connecting takes place in the field, thus the splice case itself should be compact and readily accessible.

It is highly desirable, if not necessary, that the multifiber cable which enters and the cable which exits the splice case

2 be substantially immobilized so that there will be no movement of the cable while the fibers are being worked on, and so that no movement can occur after splicing or connecting and closing and sealing the case. Thus, the case can be moved and positioned after closure without the danger of movement of the cable, thereby protecting the splices or connections from stresses arising from such movement.

Immobilizing the cable, whether at the entrance to the splice case or for any operation on the fiber has generally been addressed in the prior art by the provision of clamps, or preferably, one or more grip blocks. In the U.S. Pat. No. 4,927,227 of Bensel et al., there is shown an optical fiber cable closure which utilizes a form of clamping means for immobilizing the cable. The closure shown in that patent has first and second spaced end plates at one end thereof, through which the cable passes. Where the cable includes a metallic shield surrounding the core tube, the outermost plastic jacket of the cable is removed to a point approximately midway between the two end plates, and a portion of the metallic shield is removed. The core tube of the cable extends through the inner end plate into the splice area. A bifurcated sheath grip is attached to the cable by means of an adjustable band clamp and a bar extends between the two legs of the sheath grip for resisting torsional forces that might be imparted to the cable. A member attached to the cross member between the bifurcated legs extends outwardly from the sheath grip and helps to anchor the sheath grip to the inner plate, thereby immobilizing the sheath grip and hence, the cable. Such an arrangement performs its immobilizing function well, but requires several adjustments and bolts. Where, as is generally the case, the operations of splicing or connecting are being performed in the field, the complexity of the cable clamping arrangement makes it a time consuming operation plus placing certain demands on the capabilities of the lineman or installer performing the operation. A reduction in complexity without a compromise in the immobilization of the cable is most definitely desirable.

In U.S. Pat. No. 5,472,160 of Burek, et al., the disclosure of which is herein incorporated by reference, there is shown a grip block for use primarily with a splice closure that materially simplifies the immobilization of the optical fiber cable entering and exiting the closure. The grip block of that patent comprises a base member of suitable plastic material on which are separately and independently pivotally mounted first and second spaced cable engaging levers. Each of the levers has first and second end lobes having circular bearing surfaces which mate with corresponding curved surfaces on the base member, and curved cable engaging surfaces. The base member also has a curved surface between the spaced levers on which the cable initially resets.

A cap member has four depending actuating pins each of which is adapted to bear against a camming surface on a corresponding lobe, and also has a contoured cable receiving surface. Bolt members, which pass through both the base member and the cap, are used to lower the cap toward the base member by means of nuts being screwed down on the bolts. As the cap is lowered, the actuating pins bear against the camming surfaces and cause the engaging levers to raise the cable into engagement with the contoured cable receiving surface on the underside of the cap. As the bolts are tightened, the cable becomes firmly gripped between the lobes and the contoured surface, thereby becoming immobilized. Bolt means are used to mount the grip block to the entrance of the splice case, hence, the cable is immobilized relative to the case. This arrangement provides excellent immobilization of the cable relative to the case, however, because the lever arms are independent of each other, there exists the possibility the cap might be canted slightly or that one bolt (or nut) is not tightened as much as the other which could lead to a less than complete gripping of the cable. In addition, the installer or operator must deal with loose nuts which have to be fitted onto the bolts and uniformly tightened.

The grip block of the Burek et al. patent is capable of withstanding as much as one hundred pounds (100 lbs.) of pull-out load on the cable and one hundred eighty degrees (180°) cable rotation. It has a cable diameter capacity of from approximately 0.40 inches to 0.96 inches, with the cable automatically being positioned to be coaxial with entrance grommet members within the splice housing. Thus, there are limits on the sizes of cables with which the grip block can be used whereas, for a more universal capability, greater or lesser cable diameters might need to be immobilized.

SUMMARY OF THE INVENTION

The present invention is a universal grip block for immobilizing cables having a wide range of diameters, which has a unitary, self-contained assemblage of components, which is simple to operate, and which yields proper cable gripping in use by manipulation of only one bolt. The grip block of the invention is primarily intended for use with splice closures, but is usable with a variety of equipment where cable immobilization is desired.

In a preferred embodiment of the invention, the grip block assembly comprises a frame member having first and second lever arms pivotally mounted therein and pivotal with respect to each other about a single axis. An actuator block has first and second depending actuator legs, each of which bears against an end of a lever arm. A cap member contains a captive actuating bolt for raising and lowering the actuator block. When the actuator depending legs bear against the lever arms as the actuator block is lowered, the lever arms pivot in a scissoring action and embrace the cable to force it up into engagement with the actuator block, thereby gripping the cable between the lever arms and the actuation block.

In greater detail, the frame member has a substantially rectangular cross-section and open and closed ends. Openings on two opposed walls, for simplicity, the front and rear walls, permit passage of a cable therethrough. The lever arms are pivotally mounted on a single pivot pin which extends, below the openings, from the front wall to the rear wall of the frame member. Each of the pivot arms has a camming surface or ledge on one end thereof, and the arms are arcuately contoured for gripping a cable. The two side walls of the frame have tracks or guideways formed therein and extending from the closed end to the open end which function as guides for the ends of the lever arms and for the depending arms of the actuator block. The actuator block, itself, has a substantially V-shaped cable gripping surface formed on the side (bottom) thereof from which the legs depend, and centrally located with respect to the legs. The cap member is adapted to fit over the open end of the frame and to be latched thereto. A captive bolt is mounted in the cap in the center thereof and is threaded to the actuator block. Thus, when the bolt is rotated, it raises or lowers the actuator block depending upon the direction of rotation. When the actuator block is lowered, the ends of the depending legs bear against the ledges on the ends of the lever arms, thereby causing the free ends of the lever arms to close until they engage the cable and force it into engagement with the actuator block. Raising the actuator block releases the cable from the gripping members, i.e., the ends of the lever arms and the V-shaped gripping surface of the actuator block.

These and other features embodying the present invention will be more readily apparent from the following detailed description, read in conjunction with the accompanying drawings.

DETAILED DESCRIPTION

Figure 1:
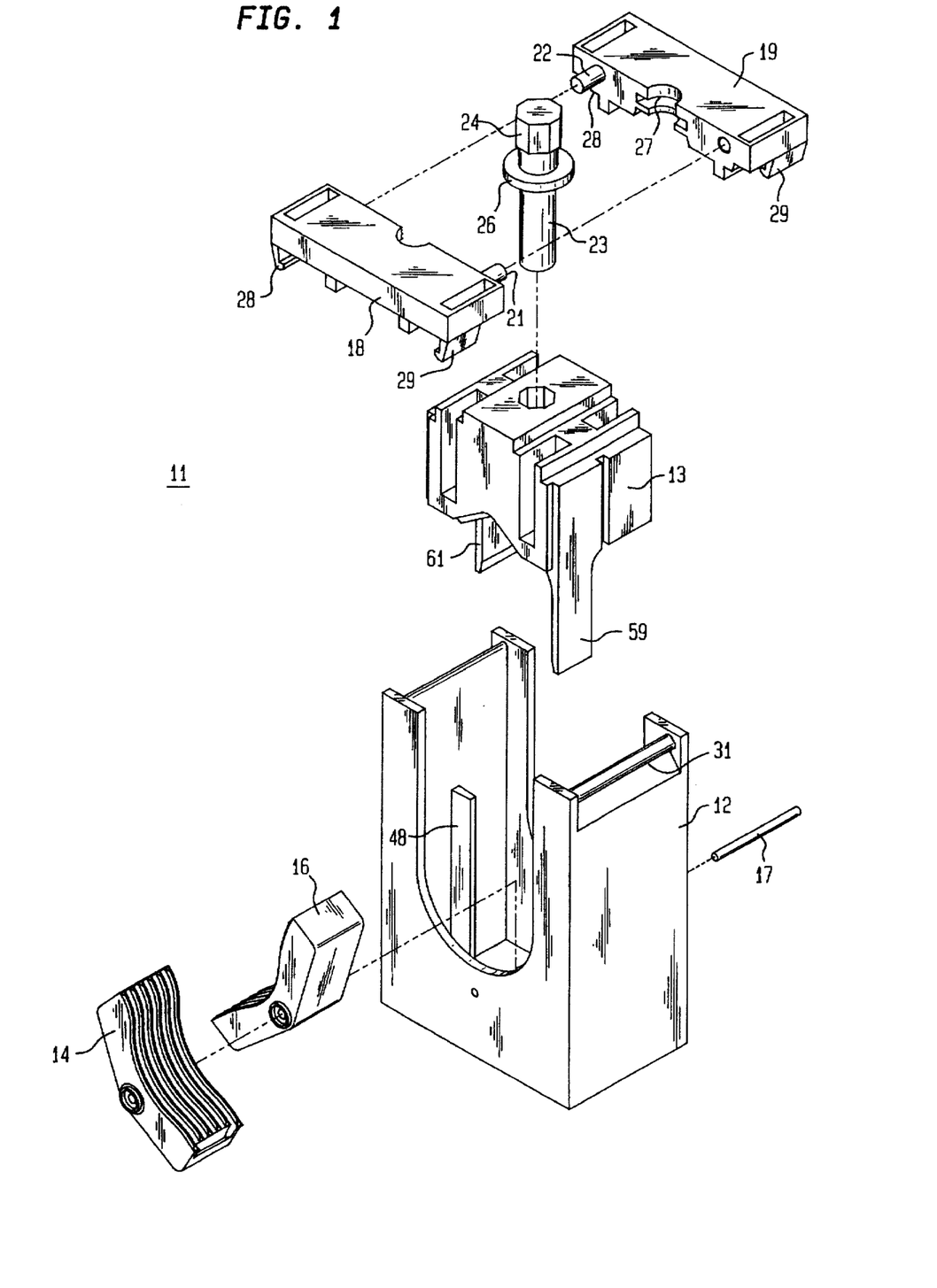
FIG. 1 is an exploded view, in perspective, of the grip block of the invention, showing the relationship of the component parts thereof.

The grip block 11 of the invention is depicted in the exploded view of FIG. 1, and comprises a frame member 12, an actuator block 13, first and second substantially identical lever arms 14 and 16, a pivot pin 17 for pivotally mounting the lever arm 14 and 16 to the frame 12 on the interior thereof, an end cap comprising first and second substantially identical members 18 and 19 which are aligned and joined by pin members 21 and 22, respectively, and a captive actuating bolt 23 having a nut-shaped upper or distal end 24 and a circular flange 26 which is adapted to fit with recesses 27 within the cap members 18 and 19, as will be discussed more fully hereinafter. Each of the cap members 18 and 19 have resilient snap latching members 28 and 29 at the ends thereof which are adapted to snap onto undercut latching members 31, only one of which is shown, on the sides of frame member 12 at the top ends thereof. The details of the construction and configuration of the various components will be more apparent from the following discussion of the figures.

In FIGS. 2A through 2D there are shown several views of the frame member of the grip block assembly of the invention. The frame 12 is preferably made of a hard, durable plastic material such as, for example, a glass filled polyester. Such a material is commercially available under the name of Valox®, made by the General Electric Corporation. Other materials might also suffice, however, it has been found that Valox® is excellent for the purpose.

Figure 2A:
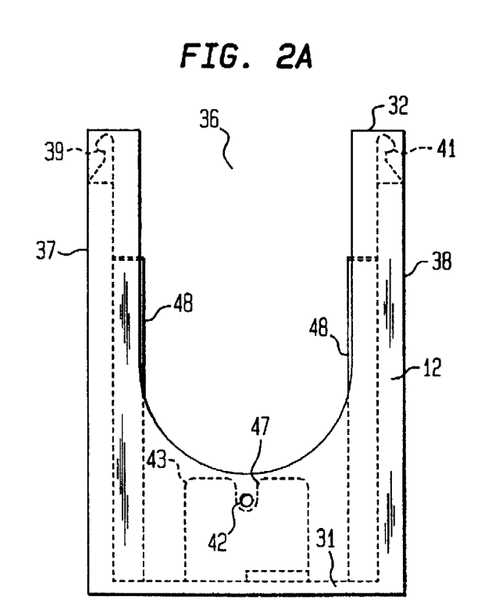
FIG. 2A is a front elevation view of the frame of the grip block.
Figure 2B:
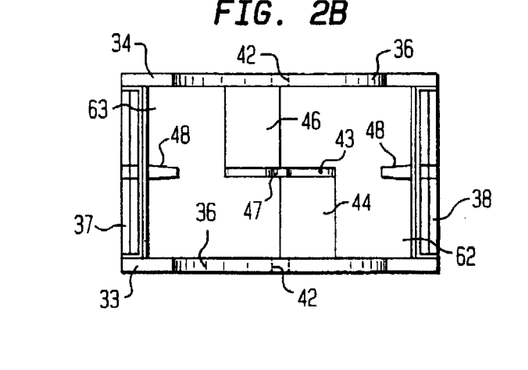
FIG. 2B is a top plane view of the frame.
Figure 2C:
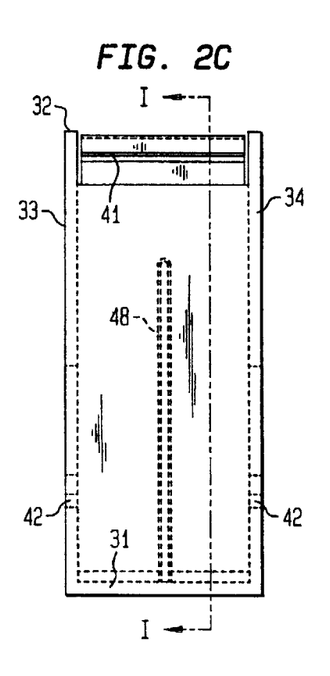
FIG. 2C is a side elevation view of the frame.
Figure 2D:
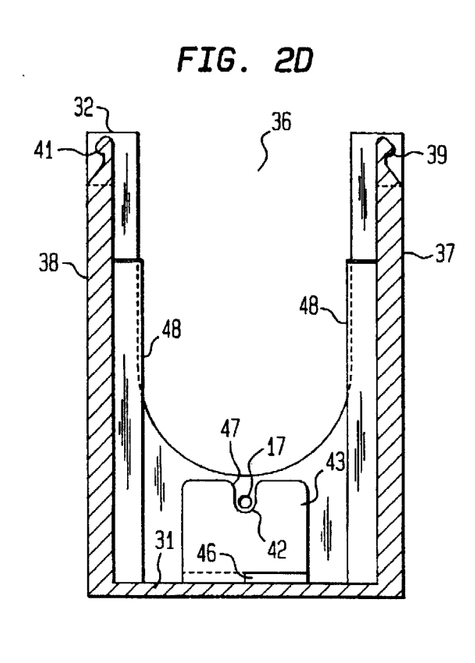
FIG. 2D is a cross-sectional view of the frame along the line I—I of FIG. 2C.

FIG. 2A is a from elevation view of the frame 12, while FIGS. 2B and 2C are top and side views, respectively, thereof. Frame 12 is, essentially, a hollow rectangular box, in configuration, closed at the bottom end 31 (as viewed in the figures) and open at the top end 32. Frame 12 has front and rear walls 33 and 34, respectively, each of which has an elongated U-shaped opening 36 therein to permit passage of a cable therethrough. First and second side walls 37 and 38 maintain the separation between front and rear walls 33 and 34, and have, at their tops ends, undercut latch members 39 and 41, the functions of which will be discussed more fully hereinafter.

Each of the front and rear walls 33 and 34 has a bore 42 located below the U-shaped opening 36 and extending through the wall to accommodate the pivot pin 17 shown in FIG. 1, which is preferably a press fit in the bores to prevent its accidentally slipping out.

Centrally located on the inner surface of the bottom wall 31 of the frame is a support bracket 43, which may be made of sheet metal, for example, having first and second feet 44 and 46 which are affixed to the inner surface wall 31. At the top of bracket 43 is a U-shaped notch 47 which is aligned with the bores 42 in walls 33 and 34 to provide support for the pin 17 under load, and which, as will be apparent hereinafter, maintains a separation between and alignment of lever arms 14 and 16. Each of the side walls 37 and 38 has a longitudinally extending rib 48 centrally located with respect to the front and rear walls 33 and 34 on the interior surface of its respective side wall, which defines a track for a portion of the actuator block 13, as will be apparent hereinafter, as well as functioning to maintain separation of the ends of the lever arms 14 and 16.

Figure 3A:
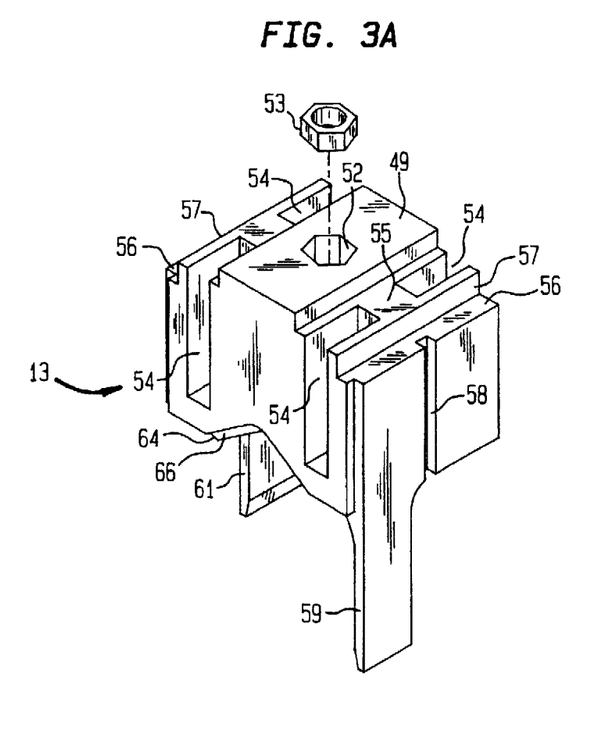
FIG. 3A is a perspective view of the actuator block.
Figure 3B:
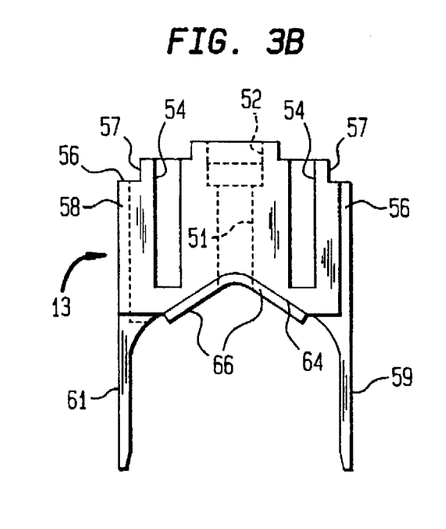
FIG. 3B is a front elevation view of the actuator block.
Figure 3C:
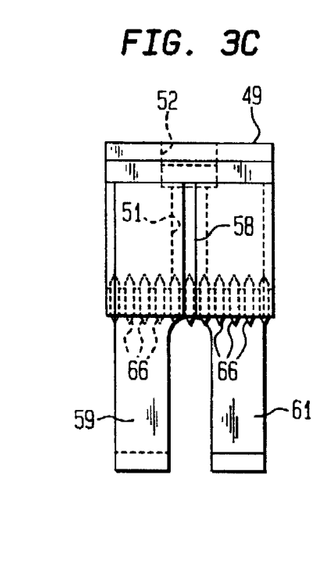
FIG. 3C is a side elevation view of the actuator block.
Figure 3D:
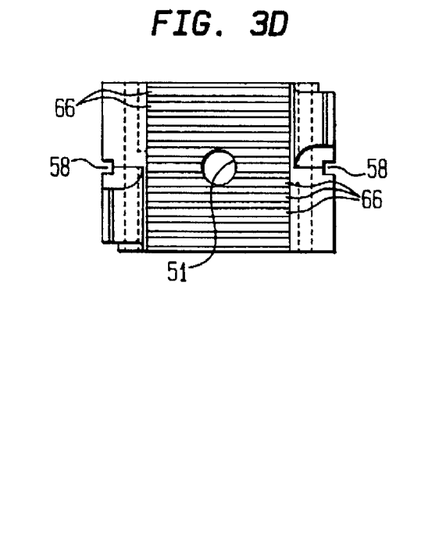
FIG. 3D is a bottom plan view of the actuator block.

FIG. 3A is a perspective view of the actuator block 13 of the grip block assembly, and FIGS. 3B, 3C and 3D are a front elevation view, side elevation view and bottom plan view, respectively thereof. Actuator block 13 comprises a block member 49, the top of which has a stepped configuration, as shown in FIG. 3B, and a central portion which has a bore 51 with a hexagonal nut receiving connector bore 52 at the top thereof. For reasons which will be apparent hereinafter, the nut 53 which fits into connector bore 52 has a left hand thread. The block member 49 has, as best seen in FIG. 3A, four slots 54 and stepped ledges 56 which together form two upstanding flanges 57 which function as guides for the cap members 18 and 19. As can best be seen in FIG. 3A, each pair of slots on the same side are separated by a web member 55 to strengthen the area adjacent the slots. The side walls of block member 49 each have centrally located slots 58 which, in conjunction with ribs 48 in the frame 12 function to locate the guide block 13 centrally and form a track up and down which the block 13 can move. Depending from the sides of block 49 are first and second offset actuator legs 59 and 61, the distal ends of which are chamfered slightly and preferably, although not necessarily, rounded. Referring back to FIG. 2B, when the block 13 is inserted in frame 12, actuator leg 59 will ride in a track 62 formed between rib 48 and the wall 33 of frame 12, and actuator leg 61 will ride in a track 63 formed between the opposite rib 48 and wall 34. The dimensions of actuator block 13 are such that it can freely move up and down within frame 12 while at the same time being guided and prevented from becoming cocked or skewed by the ribs 48 and the tracks 62 and 63. The underside of bottom of block 49 has a V-shaped portion 64 formed therein between the legs 59 and 61, the surface of which has a plurality of substantially triangularly shaped parallel ribs 66 which, as can be seen, extend transversely of the block 49. Ribs 66 function to grip the cable, especially the relatively soft outer jacket, that is being held within the grip block assembly.

Figure 4A:
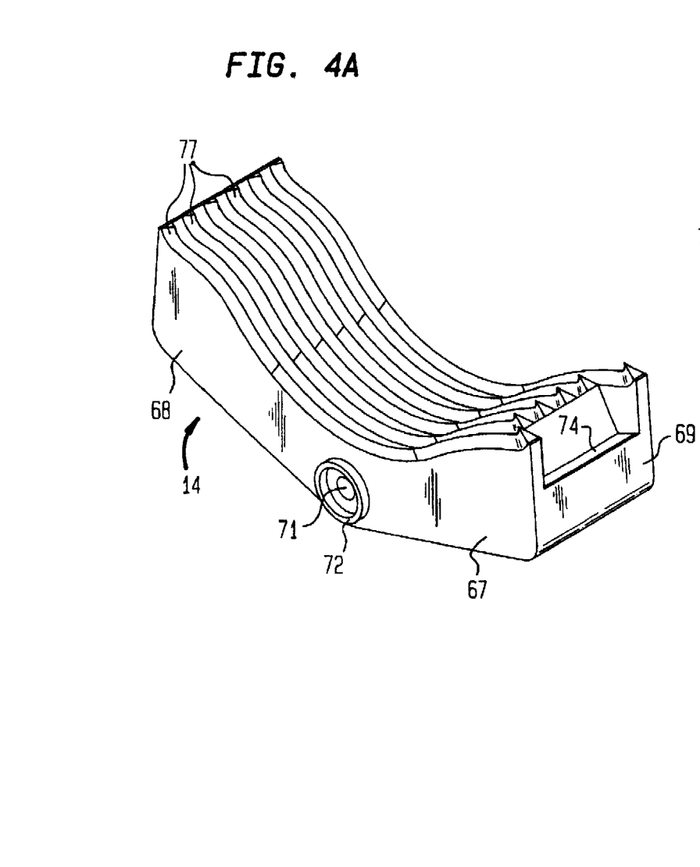
FIG. 4A is a perspective view of a lever arm of the grip block assembly.
Figure 4B:
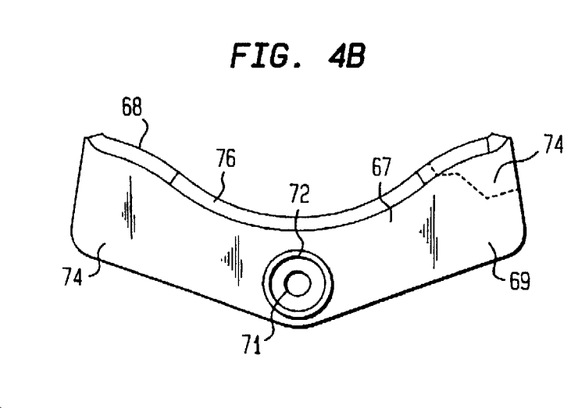
FIG. 4B is a side elevation view of the lever arm.
Figure 4C:
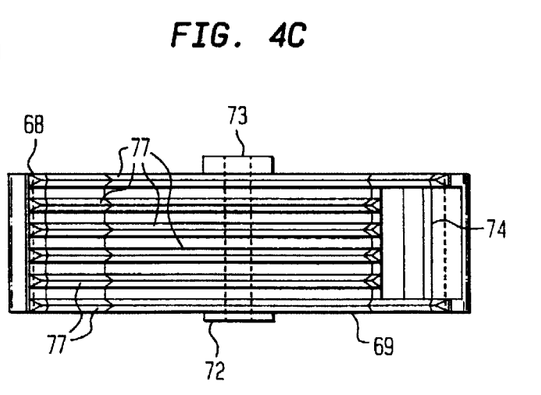
FIG. 4C is a top plan view of the lever arm.
Figure 4D:
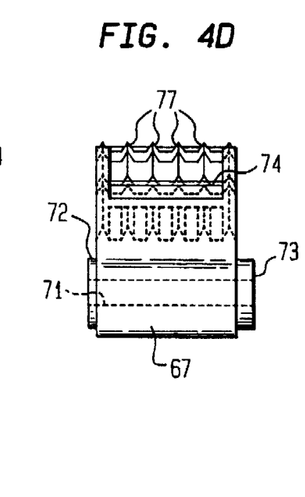
FIG. 4D is an end elevation view of the lever arm.

The lever arm 14 is shown in perspective in FIG. 4A. Lever arm 16, not shown, is substantially identical to lever arm 14, hence, the following description applies as will as FIG. 4B is a front elevation view of the arm 14, while FIGS. 4C and 4D are a top plan view thereof and an end view, respectively, of the arm of FIG. 4A. Arm 14, which is preferably made of the same material as frame 12 and actuator block 13, comprises an angled member 67 having a distal end 68 and a proximal end 69. At the apex of the angled member 67 is a bore 71 and a first and second bearing bosses 72 and 73 on either side thereof and substantially coaxial with the bore 71. Boss 73, which, in use, bears against the surface of bracket 43 and functions as a bearing surface, is shown as being slightly thicker than boss 72, which, in use, bears against the inner surface of wall 33 of frame 12, in the case of arm 14, or the inner surface of wall 34 of frame 12 in the case of arm 16. This greater thickness insures that the ends of arms 14 and 16, which are of less width than the spacing between ribs 48 and the front and rear walls of 33 and 34, will have adequate clearance for movement without being impeded in any way by the bracket 43 and the ribs 48. Thus, when the arms 14 and 16 are mounted on pin 17 which, in turn, is mounted on frame 12, they are freely pivotally movable within the channels or tracks formed between the ribs 48 and the walls of frame 12, and pivotable with respect to each other. The ribs 48 thus function to maintain a separation between the lever arms 14 and 16 as does bracket 43.

At the proximal end 69 of member 67 is a recessed camming surface or ledge 74 which is adapted to receive the distal end of arm 59 in the case of lever arm 14, or the distal end of arm 61 in the case of lever arm 16. The surface or ledge 74 is wider than the arms 59 or the arm 61 so that there is no interference between them when in use. When the lever arms 14 and 16 are pivotally mounted on pin 17 within frame 12 and actuator block 13 is lowered, the distal ends of arms 59 and 61 bear against the ledge 74 on each of arms 14 and 16 thereby depressing the ends 69 and raising the ends 68 in a scissoring action. When the actuator block is raised, the arms 14 and 16 are free to move in the opposite direction, thereby, in effect, opening the scissors.

The top or gripping surface 76 of member 67 is of approximately arcuate shape and has a plurality of substantially triangularly shaped gripping ridges 77 which extend along the length of the top 76 to the distal end 68 parallel to each other and substantially transversely to the axis of the cables being held by the grip block. It is to be understood that other gripping surfaces configurations might readily be used so long as they afford a firm grip on the outer surface of the cable sufficient to maintain immobilization thereof. Thus, as will be shown more clearly hereinafter, when the distal ends 68 of the arms 14 and 16 are scissored up into engagement with the cable, they firmly grip the cable in conjunction with the V-shaped gripping surface 64 and ridges 66 of actuator block 13.

Figure 5A:
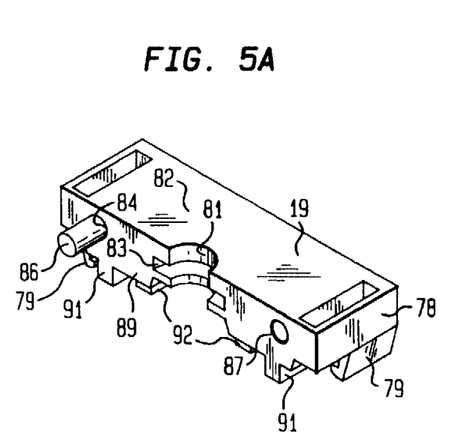
FIG. 5A is a perspective view of one of the two identical members of the end cap member of the grip block.
Figure 5B:
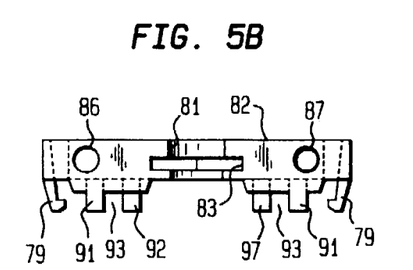
FIG. 5B is a front elevation view of the end cap members.
Figure 5C:
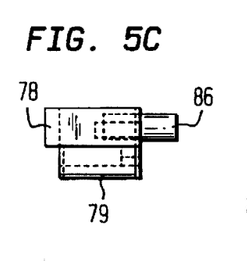
FIG. 5C is an end view of the end cap member of FIG. 5B.
Figure 5D:
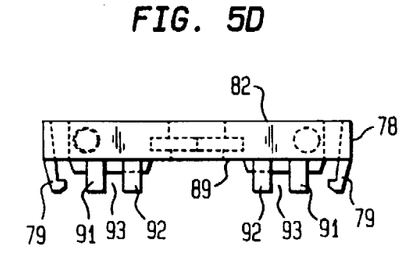
FIG. 5D is a rear elevation view of the end cap member.
Figure 5E:
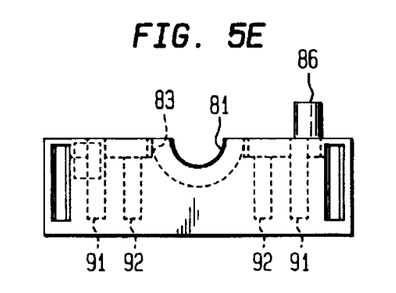
FIG. 5E is a top plan view of the end cap member.
Figure 6A:
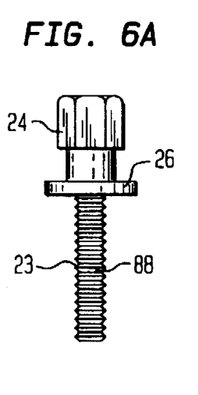
FIG. 6A is an elevation view of the actuator block actuating bolt.
Figure 6B:
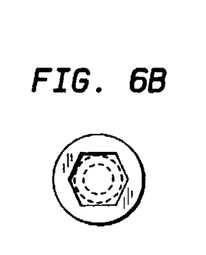
FIG. 6B is a top plan view of the bolt.

FIG. 5A depicts, in perspective, a cap member 19 which, as shown in FIG. 1, is substantially identical to cap member 18 with which it forms the cap for the grip block assembly of the invention. FIGS. 5B through 5E also depict the cap 19 in several orthogonally related views. As can be seen in these figures, the cap member 19 (and the cap member 18, not shown) comprises a rectangular member 78 which has, at each end thereof, a depending resilient latching hook 79 each of which is adapted to engage the corresponding undercut latching member 39 or 41 on frame 12 when the assembled cap is placed on top of frame 12 and snapped into place. Member 78 has a centrally located half bore 81 extending therethrough which, when members 18 and 19 are mated, forms a circular bore in conjunction with the corresponding half bore in member 18. Coaxial with half bore 81 and located a distance below the top surface 82 of member 78 is a semi-circular recess 83 having a radius greater than that half bore 81 which functions to make captive the actuating bolt 23, as will be explained more fully hereinafter. At one end of the body 78 is a bore 84 into which a locating pin 86 is press fitted and at the opposite end of body 78 is a bore 87 for receiving, in a slip fit, the pin 86 on the other cap member 18. Thus, when the pins 86 in member 18 and member 19 are fitted into the corresponding holes 87, the two cap members 18 and 19 can be pressed together to form an assembled cap. Prior to the two members 18 and 19 being fitted and pressed together, the actuating bolt 23, shown in FIGS. 6A and 6B, must be inserted in the bore 81 of one of the cap members. As seen in FIGS. 6A and 6B, bolt 23 has a threaded shank portion 88, a circular flange 26, and a hexagonal headed portion 24. Of course, headed portion 24 need not be hexagonal in shape, but can be square or otherwise, so long as a wrench or other tool may obtain purchase to rotate the bolt 23. Flange portion 26 is dimensional to be a loose fit in recess 83 so that the bolt 23 may be turned freely when the cap members 18 and 19 are mated to form the cap. On the other hand, the bolt is captive within the cap and is held in place against longitudinal movement. On the bottom or underside 89, on either side of the bore 81, are first and second spaced lands or ridges 91 and 92 which form, between them, a groove or recess 93 for receiving the flanges 57 on actuator block 13 when the block 13 is raised to its uppermost position. The lands 92 are somewhat shorter than the lands 91 so that when cap member 18 and 19 are fitted together, there is a gap between the ends of the lands 92 for accommodating the web 55 on either side of the block 13.

Figure 7:
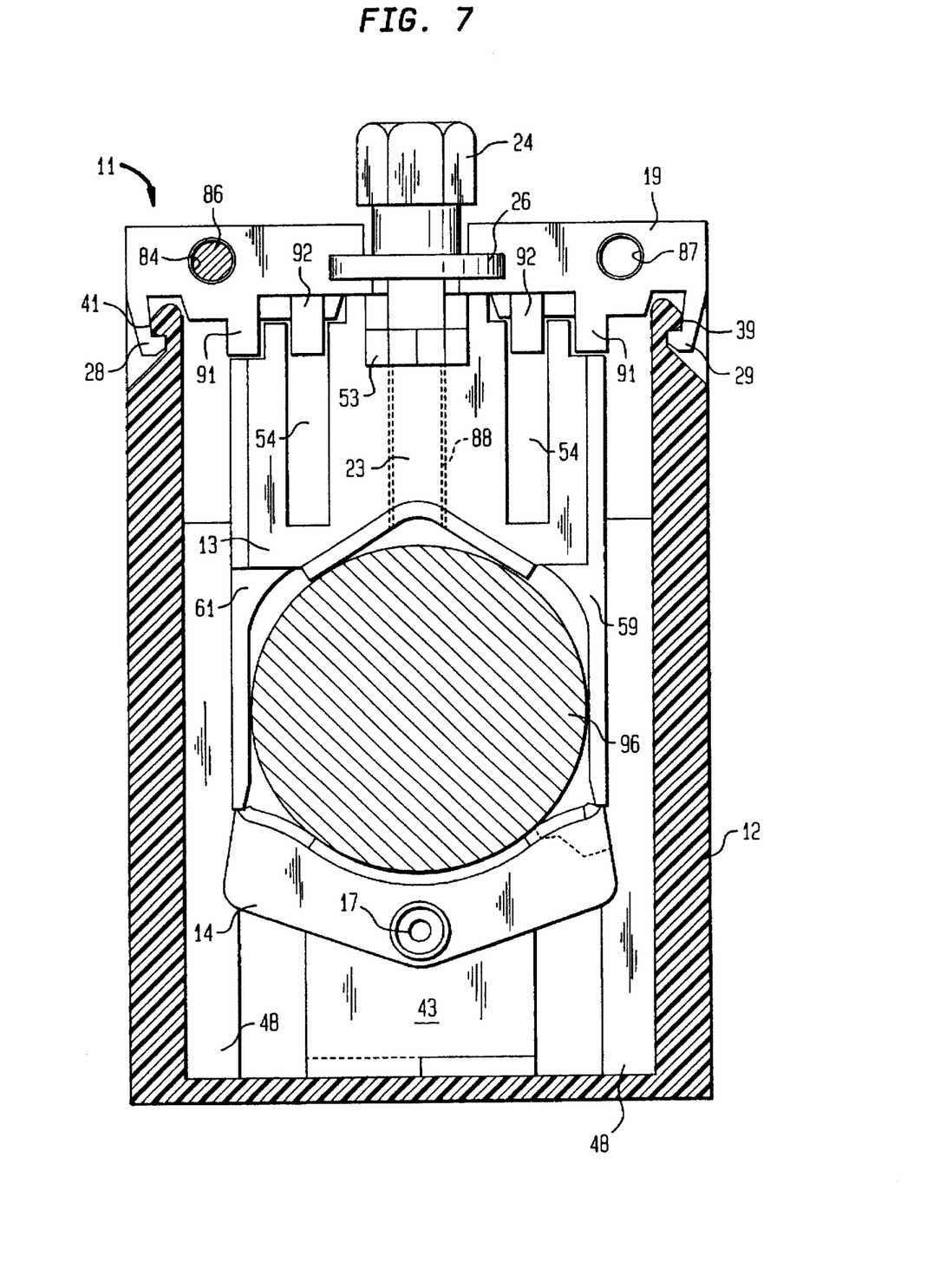
FIG. 7 is an elevation cross-sectional view of the grip block assembly shown gripping a large diameter cable.
Figure 8:
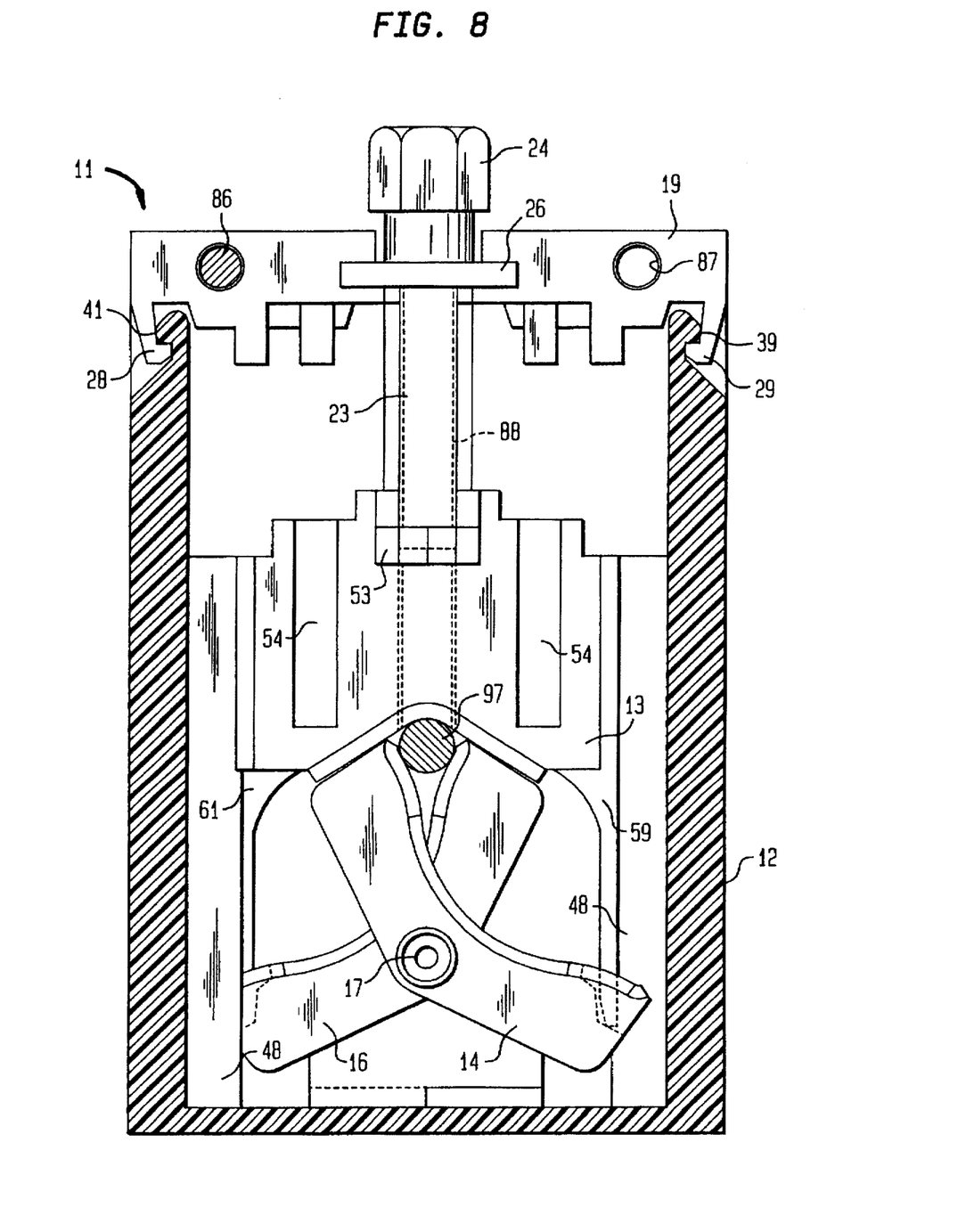
FIG. 8 is an elevation cross-sectional view of the grip block assembly shown gripping a small diameter cable.

FIG. 7 depicts, in cross section, the assembled grip block 11 as it grips a large diameter cable 96. As can be seen, the actuator block has been moved to the upper limit of its travel, and the lever arms 14 and 16, only arm 14 being shown, are at their maximum diameter gripping position. FIG. 8, on the other hand, depicts the assembled grip block 11 as it grips an extremely small diameter cable. The actuating bolt 23, which preferably has left-hand thread, has been turned (in a clockwise direction for a left-hand thread) to lower the actuator block 13 and thereby cam the lever arms 14 and 16 to their minimum diameter gripping position, to grip the small diameter cable 97. Obviously, the grip block 11 of the invention can be dimensioned to grip an unusually large cable, but with some sacrifice in gripping extremely small cables, however, the intended applications of the invention, involving a cable diameter range of from 0.020 to 1.5 inches, the frame member 12 is dimensioned to be approximately 2.4 inches wide, approximately 1.5 inches deep (front to rear) and approximately 3.5 inches high, with the remaining components dimensioned accordingly. This range of cable diameters is greater than the prior art grip blocks as exemplified by the grip block of the aforementioned Burek et al. patent.

The grip block is usable in a number of possible applications, such as in conjunction with a splice case where it can be mounted on the interior or exterior thereof by suitable means. It can be mounted in any number of ways, depending upon the particular application, and affords positive cable gripping and immobilization by means of the turning of a single bolt, over an unusually wide range of cable diameters. It is usable with virtually all types of cables within the diameter range, whether metallic conductor cables or optical fiber cables, and because of its simplicity and lack of separate detachable parts, can be carried by an installer as a part of his tool kit, where necessary or desired.

From the preceding detailed description of the apparatus of the invention, it should be apparent that it would be obvious to those skilled in the art that many variations and modifications might be made to the disclosed preferred embodiment with any substantial departure from the principles of the invention. All such variations and modifications are intended to be included herein as within the scope of the present invention. Further, in the claims, the corresponding structures, materials, acts, and equivalents of all means or step plus function limitations are intended to include any structure, material, or acts for performing the functions in combination with other claimed elements as specifically set forth.

We claim:

1. A grip block assembly for gripping and holding a cable comprising:

a frame member having first and second spaced walls, each having a cable receiving opening therein, said walls being spaced apart by a first side wall and a second side wall, said walls defining an open top interior space within said frame member;

first and second cable gripping lever arms pivotally mounted to said frame member an pivotal with respect to each other about a single axis;

a cap member;

means for causing said lever arms to pivot into engagement with a cable, said means comprising an actuator block reciprocally movable within said open interior space into and out of engagement with said lever arms; and means for moving said actuator block.

2. A grip block assembly as claimed in claim 1 wherein said cap member comprises first and second members adapted to be joined together to form said cap member with a central bore extending therethrough.

3. A grip block assembly as claimed in claim 2 wherein said means for moving said actuator block comprises a bolt extending through said central bore of said cap member and connected to said actuator block.

4. A grip block assembly as claimed in claim 3 wherein said bolt is maintained in a relatively fixed position longitudinally by said cap member and is free to rotate with respect thereto.

5. A grip block assembly as claimed in claim 3 wherein said bolt is threadably connected to said actuator block.

6. A grip block assembly as claimed in claim 1 wherein said cap member has first and second ends, each end having a resilient hook latch member depending therefrom, and each of said side walls having undercut latch surfaces at the open top of said frame for receiving said hook latch members to affix said cap member in place over the open top of said frame member.

7. A grip block assembly as claimed in claim 1 wherein each of said first and second cable gripping lever arms comprises an elongated member having a proximal end and a distal end and having a mounting bore located centrally between said ends.

8. A grip block assembly as claimed in claim 7 wherein each said elongated member has first and second bearing bosses on either side thereof and substantially coaxial with said bore.

9. A grip block assembly as claimed in claim 7 and further including first and second bores in said first and second walls respectively of said frame, and a mounting pin extending through said bores and the bores in said lever arms for pivotally mounting the lever arms in the interior space of said frame and pivotably with respect to each other.

10. A grip block assembly as claimed in claim 9 and further including a support bracket approximately centrally located between said first and second spaced walls for supporting said mounting pin.

11. A grip block assembly as claimed in claim 7 wherein the proximal end of each of said first and second lever arms has a recessed camming surface formed thereon.

12. A grip block assembly as claimed in claim 1 wherein said actuator block has means thereon for causing said cable gripping lever arms to pivot with respect to each other.

13. A grip block assembly as claimed in claim 12 wherein said means for causing said lever arms to pivot relative to each other comprises first and second elongated actuator legs depending from said actuator block.

14. A grip block assembly as claimed in claim 13 wherein said actuator legs are offset from each other.

15. A grip block assembly as claimed in claim 13 wherein each of said side walls has means forming a guiding track for said actuator legs and for said lever arms.

16. A grip block assembly as claimed in claim 15 wherein said means forming a guiding track comprises an elongated rib extending into the interior space of said frame member.

17. A grip block assembly as claimed in claim 16 wherein each said elongated rib is centrally located between said first and second spaced walls.

18. A grip block assembly as claimed in claim 13 wherein said actuator block has a shaped surface located between said actuator legs for gripping a cable.

19. A grip block assembly for gripping and holding an elongated member comprising:
a substantially hollow frame member having openings therein for passage of an elongated member therethrough;
first means within said frame member for gripping a portion of the elongated member, said first means being reciprocally movable within said frame member;
second means within said frame member for gripping a different portion of the elongated member, said second means comprising first and second gripping members pivotally mounted to said frame member along a single axis; and
actuator means for causing said gripping members to pivot into engagement with the elongated member.

20. A grip block assembly as claimed in claim 19 wherein said first and second gripping members are pivotal with respect to each other along said single axis.

21. A grip block assembly as claimed in claim 19 wherein said actuator means comprises at least one elongated leg depending from said first means for gripping an adaptor to engage said first gripping member at a point spaced from said single axis.

22. A grip block assembly as claimed in claim 21 and further comprising means for causing said first means for gripping to move toward said first gripping member to cause said elongated leg to engage said first gripping member and cause it to pivot.

23. A grip block assembly as claimed in claim 22 and further including a second elongated leg depending from said first means for gripping for engaging said second gripping member at a point spaced from said single axis to cause it to pivot.

24. A grip block assembly as claimed in claim 23 wherein said one elongated leg causes said first gripping member to pivot about said single axis in one direction and said second elongated leg causes said second gripping member to pivot about said single axis in a direction opposite to said one direction.

* * * * *